(12) United States Patent
Okazaki et al.

(10) Patent No.: US 12,424,712 B2
(45) Date of Patent: Sep. 23, 2025

(54) PLATE FOR BATTERY STACK

(71) Applicants: Yazaki Corporation, Tokyo (JP); TOYOTA JIDOSHA KABUSHIKI KAISHA, Toyota (JP); KABUSHIKI KAISHA TOYOTA JIDOSHOKKI, Kariya (JP)

(72) Inventors: Yutaro Okazaki, Kakegawa (JP); Shinichi Yanagihara, Kakegawa (JP); Satoshi Morioka, Okazaki (JP); Motoyoshi Okumura, Nagoya (JP); Hiromi Ueda, Kariya (JP); Naoto Morisaku, Kariya (JP)

(73) Assignees: YAZAKI CORPORATION, Tokyo (JP); TOYOTA JIDOSHA KABUSHIKI KAISHA, Aichi-ken (JP); KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 629 days.

(21) Appl. No.: 17/733,360

(22) Filed: Apr. 29, 2022

(65) Prior Publication Data
US 2022/0352608 A1 Nov. 3, 2022

(30) Foreign Application Priority Data
Apr. 30, 2021 (JP) ................. 2021-078138

(51) Int. Cl.
*H01M 50/557* (2021.01)
*H01M 10/613* (2014.01)
*H01M 50/403* (2021.01)
*H01M 50/593* (2021.01)

(52) U.S. Cl.
CPC ....... *H01M 50/557* (2021.01); *H01M 10/613* (2015.04); *H01M 50/403* (2021.01); *H01M 50/593* (2021.01)

(58) Field of Classification Search
None
See application file for complete search history.

(56) References Cited

U.S. PATENT DOCUMENTS

2016/0344012 A1* 11/2016 Fukushima ............ H01G 4/38
2018/0108953 A1*  4/2018 Tomobe ................ B60L 3/0046
2021/0066695 A1*  3/2021 Sato .................... H01M 50/557

FOREIGN PATENT DOCUMENTS

| JP | 2012-195305 A | 10/2012 |
| JP | 2017-50171 A  | 3/2017 |
| JP | 2018-67388 A  | 4/2018 |
| JP | 2019-32960 A  | 2/2019 |
| JP | 2020198211 A  | 12/2020 |

* cited by examiner

*Primary Examiner* — Mark Ruthkosky
*Assistant Examiner* — Sarah J Jacobson
(74) *Attorney, Agent, or Firm* — Sughrue Mion, PLLC

(57) ABSTRACT

There is provided a plate for a battery stack including: a plate-shaped terminal to which an electric wire is connected; and a plate-shaped housing having an accommodating recess where the terminal is accommodated. The accommodating recess includes a retaining hole, and the terminal includes a connection portion that is electrically connected to a counterpart member, and a retaining piece that is inserted into the retaining hole and locked to the retaining hole.

5 Claims, 6 Drawing Sheets

PLATE FOR BATTERY STACK

This application is based on and claims priority under 35 USC 119 from Japanese Patent Application No. 2021-078138 filed on Apr. 30, 2021, the contents of which are incorporated herein by reference.

TECHNICAL FIELD

The present disclosure relates to a plate for a battery stack.

BACKGROUND ART

Various power storage devices have been proposed in related-art, and for example, a power storage device disclosed in JP2020198211A includes a plurality of stacked power storage modules and a plurality of plate-shaped members disposed between the power storage modules.

The plurality of power storage modules and the plurality of plate-shaped members are disposed between a pair of insulating plates, and a restraining force is applied thereto by a restraining tool, thereby constituting a stacked body (battery stack) formed in a substantially rectangular parallelepiped shape.

The power storage module includes a resin frame, a plurality of battery cells, and a plurality of current collector plates. The plate-shaped member includes a conductive portion (conductive plate) that electrically connects adjacent power storage modules to each other, and an insulating portion (plate for battery stack) disposed on an outer periphery of the plate-shaped member. Since the insulating portion of the plate-shaped member is located on an outer peripheral surface of the energy storage device, an amount of exposure of the conductive portion from the outer peripheral surface of the energy storage device can be reduced.

The power storage device configured as described above may be electrically connected to a detection circuit in order to detect a voltage value, a current value, or the like of the power storage device. For example, the detection circuit is connected to a terminal provided on the plate-shaped member, and detects the voltage value or the current value of the power storage device. As described above, it is necessary to provide the terminal on the plate-shaped member, and JP2020198211A discloses that the terminal is provided on the insulating portion of the plate-shaped member. However, JP2020198211A does not specifically disclose how to provide the terminal.

Therefore, as a method of providing the terminal in the insulating portion of the plate-shaped member, for example, a method of providing an accommodating recess capable of accommodating the terminal in the insulating portion of the plate-shaped member to accommodate the terminal in the accommodating recess is considered. However, if the terminal is simply placed in the accommodating recess, the terminal may fall off from the plate-shaped member.

Therefore, it is conceivable to prevent the terminal from falling off by providing the plate-shaped member with a lock structure that presses the terminal from an upper side to a lower side. However, the plate-shaped member may be sandwiched between the plurality of stacked power storage modules as described above, and a length of the plate-shaped member in a plate thickness direction is limited, so it is difficult to provide the lock structure.

As described above, it is difficult to configure the related-art power storage device so as to prevent the terminal from falling off.

SUMMARY OF INVENTION

The present disclosure provides a plate for a battery stack that prevents a terminal from falling off.

According to an illustrative aspect of the present disclosure, a plate for a battery stack includes: a plate-shaped terminal to which an electric wire is connected: and a plate-shaped housing having an accommodating recess where the terminal is accommodated. The accommodating recess includes a retaining hole. The terminal includes a connection portion that is electrically connected to a counterpart member, and a retaining piece that is inserted into the retaining hole and locked to the retaining hole.

The present disclosure has been briefly described above. Further, the details of the present disclosure will be further clarified by reading through embodiments for carrying out the invention described below with reference to the accompanying drawings.

BRIEF DESCRIPTION OF DRAWINGS

FIG. 4A is a view of FIG. 3 as viewed from a lateral side, and FIG. 4B is a view corresponding to FIG. 4A, showing an initial state of inserting the retaining piece into the retaining hole.

DESCRIPTION OF EMBODIMENTS

Embodiment

Hereinafter, an example of an embodiment according to the present disclosure will be described with reference to the drawings.

Figure 1:
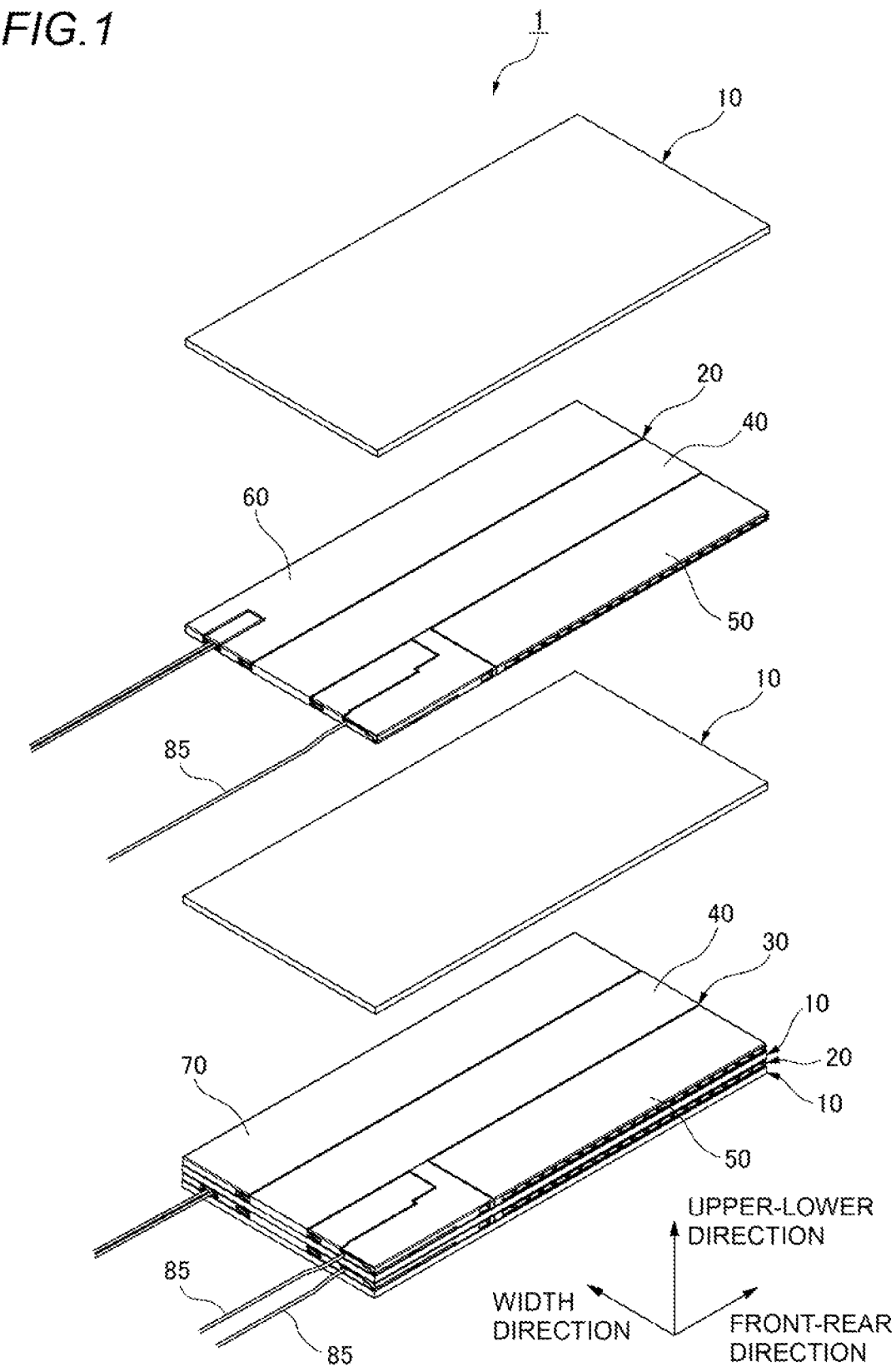
FIG. 1 is an exploded perspective view of a main part of a battery stack according to an embodiment of the present disclosure.

FIG. 1 is an exploded perspective view of a main part of a battery stack 1 according to an embodiment of the present disclosure.

Hereinafter, for convenience of description, as shown in FIGS. 1 to 7, a "front-rear direction", an "upper-lower direction", a "width direction", "front", "rear", "upper", and "lower" are defined. The "front-rear direction", the "width direction", and the "upper-lower direction" are orthogonal to one another. The front-rear direction coincides with an extending direction of a housing 51 and a pull-out direction of an electric wire 85. A direction from a front side to a rear side in the front-rear direction coincides with an insertion direction in which a retaining piece 84 of a connection terminal 80 is inserted into a retaining hole 54. The upper-lower direction coincides with a plate thickness direction of the housing 51 and the connection terminal 80. The width direction coincides with a fitting direction of both side edge portions of a conductive plate 40 and fitting grooves of plates 50, 60, 70 for the battery stack. A direction in which the plate 50 for the battery stack approaches a side edge portion of the conductive plate 40 is referred to as the "fitting direction".

As shown in FIG. 1, the battery stack 1 according to the present embodiment includes a plurality of (four in the present example) stacked power storage modules 10, and a plurality of plate-shaped members 20, 30 respectively disposed between the plurality of power storage modules 10. The battery slack 1 is disposed between a pair of insulating plates (not shown) and is formed in a substantially rectangular parallelepiped shape by a restraining tool (not shown).

The power storage module 10 is formed in a rectangular flat plate shape including, for example, a plurality of battery cells, a plurality of current collector plates, and a resin frame. The battery cell includes a positive electrode mixture layer formed of nickel hydroxide or the like, a negative electrode mixture layer formed of a hydrogen adsorption alloy or the like, a separator formed of a porous film formed of a polyolefin-based resin or the like, and an electrolytic solution.

The power storage module 10 may be configured by a single battery cell, and a configuration of the battery cell is not limited to the above-described configuration, and various known battery configurations may be adopted.

As shown in FIG. 1, the plate-shaped member 20 according to the present embodiment is formed in a rectangular flat plate shape including the conductive plate 40, and the plate 50 for the battery stack and the plate 60 for the battery stack respectively fitted to both side edge portions of the conductive plate 40.

The plate-shaped member 30 according to the present embodiment is formed in a rectangular flat plate shape including the conductive plate 40, and the plate 50 for the battery stack and the plate 70 for the battery stack respectively fitted to both side edge portions of the conductive plate 40.

The conductive plate 40 is formed in an elongated rectangular plate shape by a metal such as an aluminum alloy or copper, and both side edge portions in a longitudinal direction are formed in a convex piece shape having a thin plate thickness (not shown). Both side edge portions of the conductive plate 40 are respectively fitted into a fitting groove 56 of the plate 50 for the battery stack and a fitting groove (not shown) of the plate 60 or the plate 70 for the battery stack.

The conductive plate 40 is a conductive portion that electrically connects the adjacent power storage modules 10 to each other, and also serves as a heat sink that cools the adjacent power storage modules 10.

Figure 2:
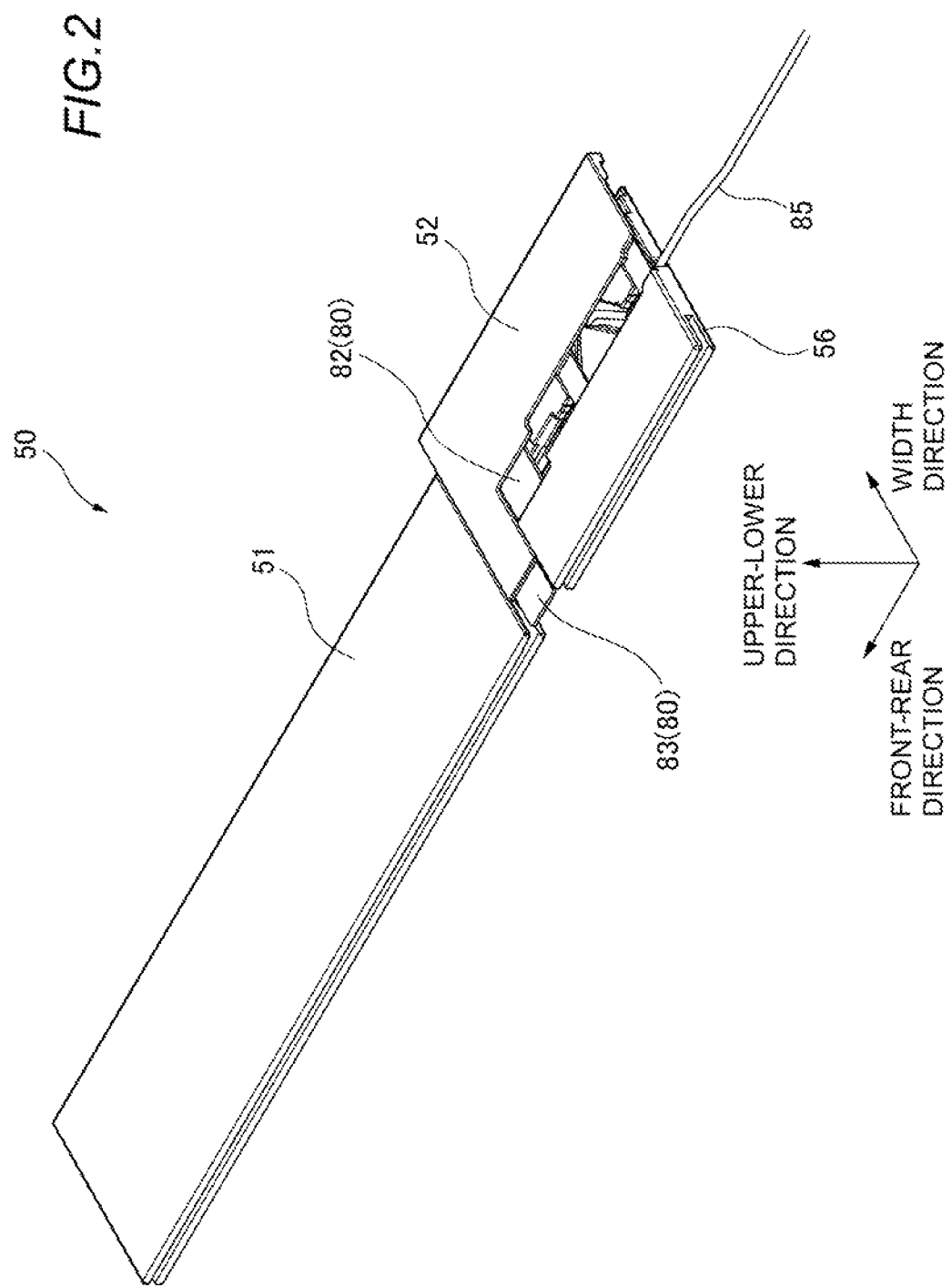
FIG. 2 is a perspective view of a plate for the battery stack shown in FIG. 1 in a state in which an insulating cover is temporarily locked.
Figure 3:
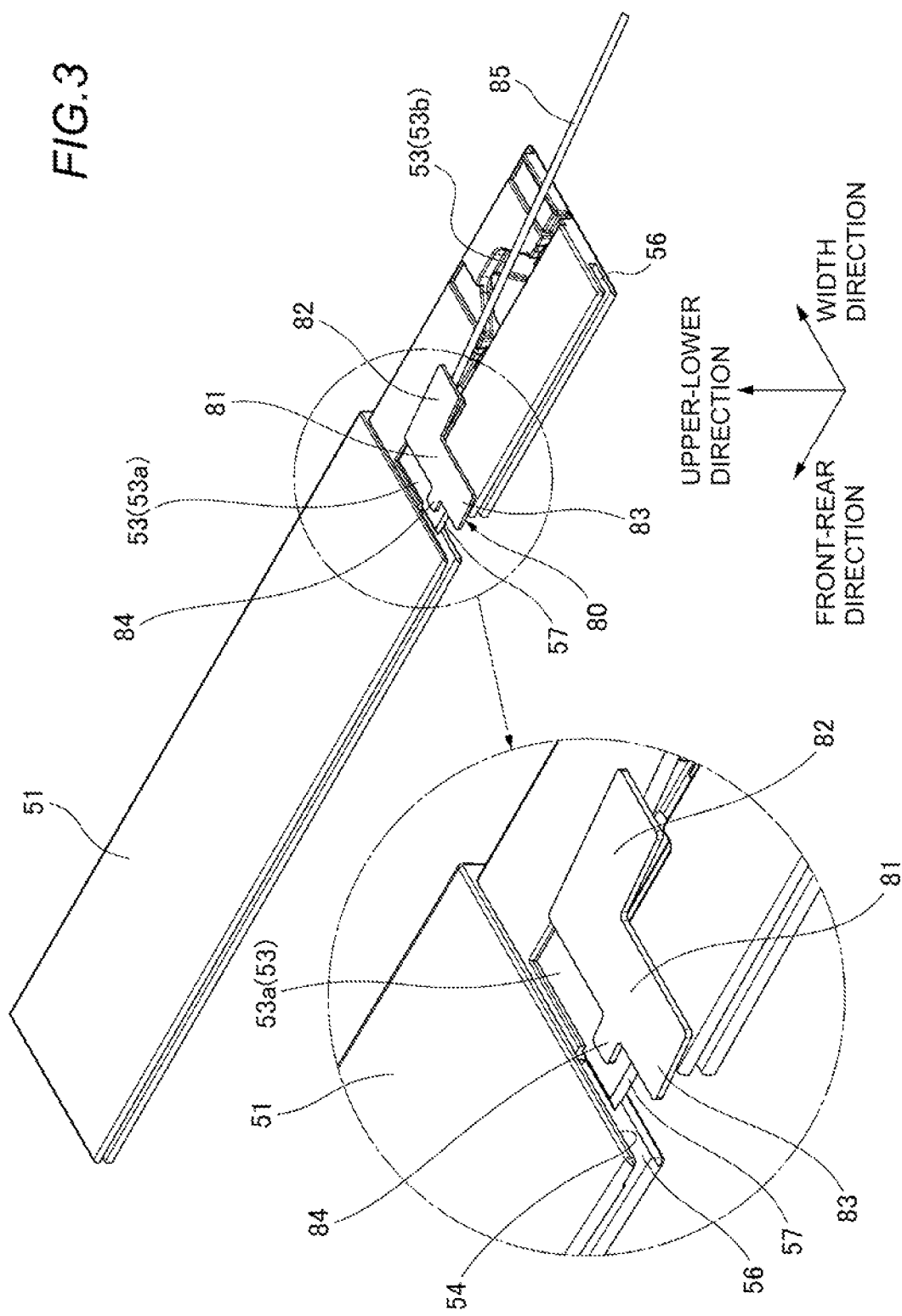
FIG. 3 is a perspective view showing a state in which a connection terminal is accommodated in a housing in the plate for the battery slack shown in FIG. 1.

FIG. 2 is a perspective view showing a temporarily locked state of the plate 50 for the battery stack. FIG. 3 is a perspective view showing a state in which the connection terminal 80 is accommodated in the housing 51.

As shown in FIGS. 2 and 3, the plate 50 for the battery stack according to the present embodiment includes the rectangular plate-shaped housing 51 elongated in the front-rear direction, the connection terminal 80 accommodated in the housing 51, the electric wire 85 connected to a front terminal of the connection terminal 80, and an insulating cover 52.

As particularly shown in FIG. 3, the housing 51 according to the present embodiment is provided with an accommodating recess 53 recessed downward from an upper plate surface. The accommodating recess 53 includes a terminal accommodating recess 53a where the connection terminal 80 is accommodated and an electric wire accommodating recess 53b where the electric wire 85 is accommodated.

The terminal accommodating recess 53a has a shape corresponding to an outer peripheral shape of the connection terminal 80. The terminal accommodating recess 53a is provided with a retaining hole 54 into which the retaining piece 84 of the connection terminal 80 is inserted. Specifically, the retaining hole 54 is provided so as to be recessed rearward from a wall portion of the terminal accommodating recess 53a on a rear side.

The terminal accommodating recess 53a has an inclined surface 55 that is inclined such that a plate thickness of the housing 51 decreases from the front side toward the rear side in the front-rear direction (that is, along the insertion direction). In other words, the inclined surface 55 is inclined downward from the front side toward the rear side. The inclined surface 55 is provided in vicinity of an opening of the retaining hole 54 (see FIGS. 4A and 4B). Specifically, the inclined surface 55 is provided so as to be positioned in the retaining hole 54.

The terminal accommodating recess 53a has a cutout portion 57 formed by cutting out a portion corresponding to a connection portion 83 of the connection terminal 80 along the width direction. The cutout portion 57 is located on the same side as the fitting groove 56 in the width direction. In other words, the cutout portion 57 is provided on a distal end side in the fitting direction.

As shown in FIG. 3, the connection terminal 80 according to the present embodiment is formed in a substantially L-shape including a first portion 81 extending along the width direction and a second portion 82 extending along the front-rear direction and continuous with the first portion 81.

The connection terminal 80 includes the connection portion 83 that is electrically connected to the conductive plate 40 on a distal end side of the first portion 81 in the fitting direction. Since the cutout portion 57 is located below the connection portion 83 in the terminal accommodating recess 53a, the connection portion 83 is exposed downward when the connection terminal 80 is accommodated in the terminal accommodating recess 53a.

When a side edge portion of the conductive plate 40 is fitted into the fitting groove 56 of the plate 50 for the battery stack, the side edge portion of the conductive plate 40 enters the cutout portion 57. That is, since the side edge portion of the conductive plate 40 enters below the connection portion 83, the connection portion 83 and the side edge portion of the conductive plate 40 come into contact with each other, and the conductive plate 40 and the plate 50 for the battery stack are electrically connected to each other. In the present embodiment, the conductive plate 40 corresponds to a counterpart member.

The connection terminal 80 further includes the retaining piece 84 at the first portion 81. The retaining piece 84 is provided at a position corresponding to the retaining hole 54 and protrudes rearward in the front-rear direction from a rear side edge of the first portion 81. In the plate 50 for the battery stack, the connection terminal 80 is prevented from falling off from the housing 51 by inserting the retaining piece 84 into the retaining hole 54.

The electric wire 85 is connected to a front end portion of the second portion 82. The electric wire 85 according to the present embodiment is accommodated in the electric wire accommodating recess 53b, and is pulled out from a front side of the housing 51 along the front-rear direction (see FIG. 1). For example, a voltage detection circuit or the like is connected to the other end of the electric wire 85 on a side opposite to one end connected to the second portion 82. Accordingly, a voltage value and the like of the battery stack 1 are detected.

Figure 4A:
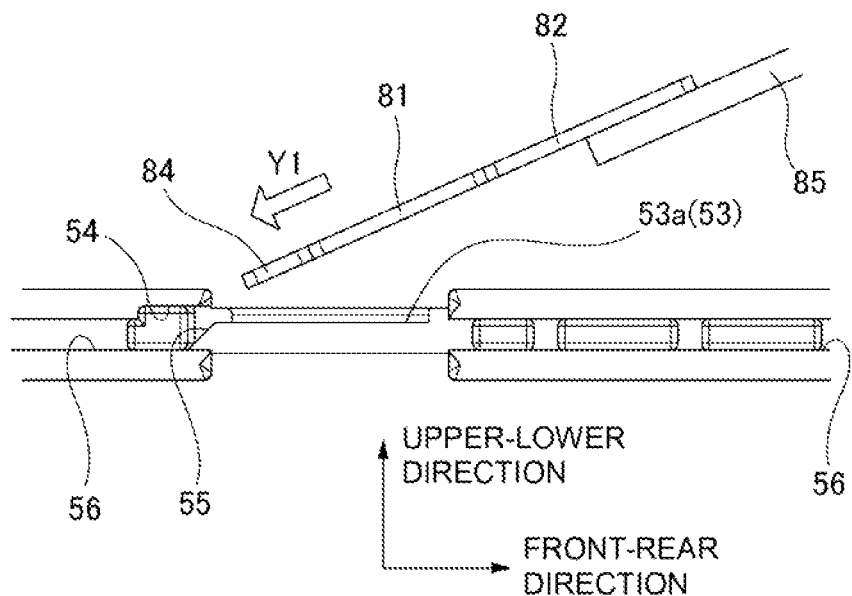
FIGS. 4A and 4B are views for explaining a step of inserting a retaining piece of a connection terminal into a retaining hole of the housing.
Figure 4B:
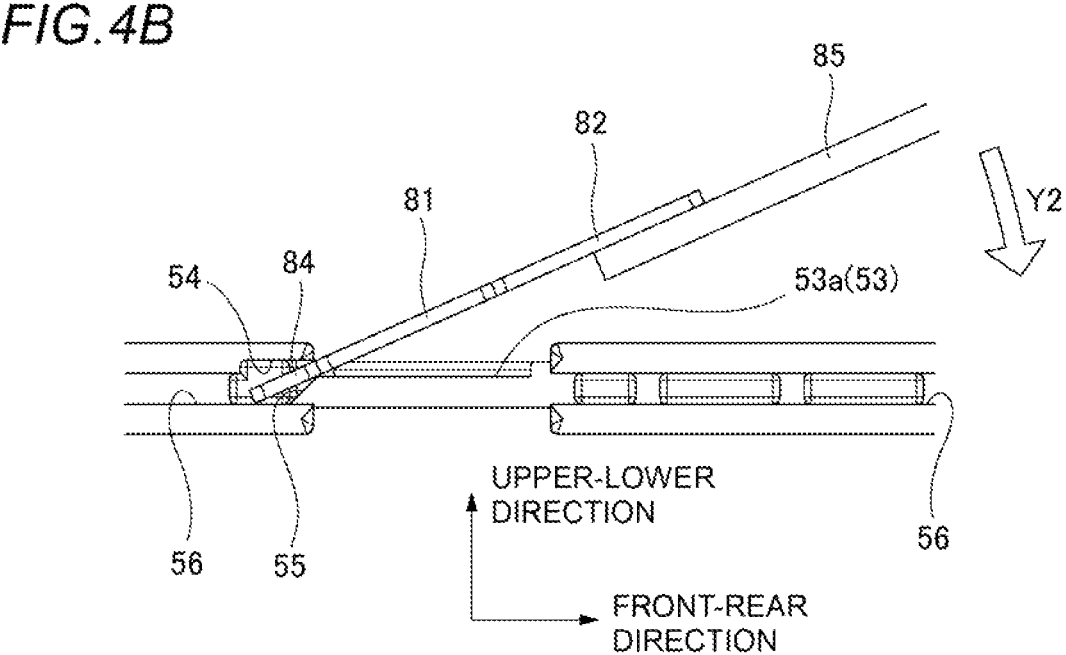
Figure 5:
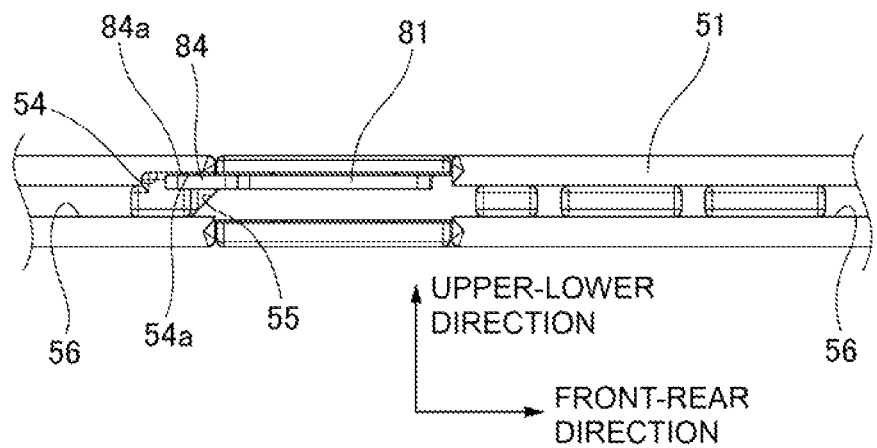
FIG. 5 is a view corresponding to FIGS. 4A and 4B, showing a state in which the retaining piece is completely inserted into the retaining hole and the connection terminal is accommodated in the housing.
Figure 6:
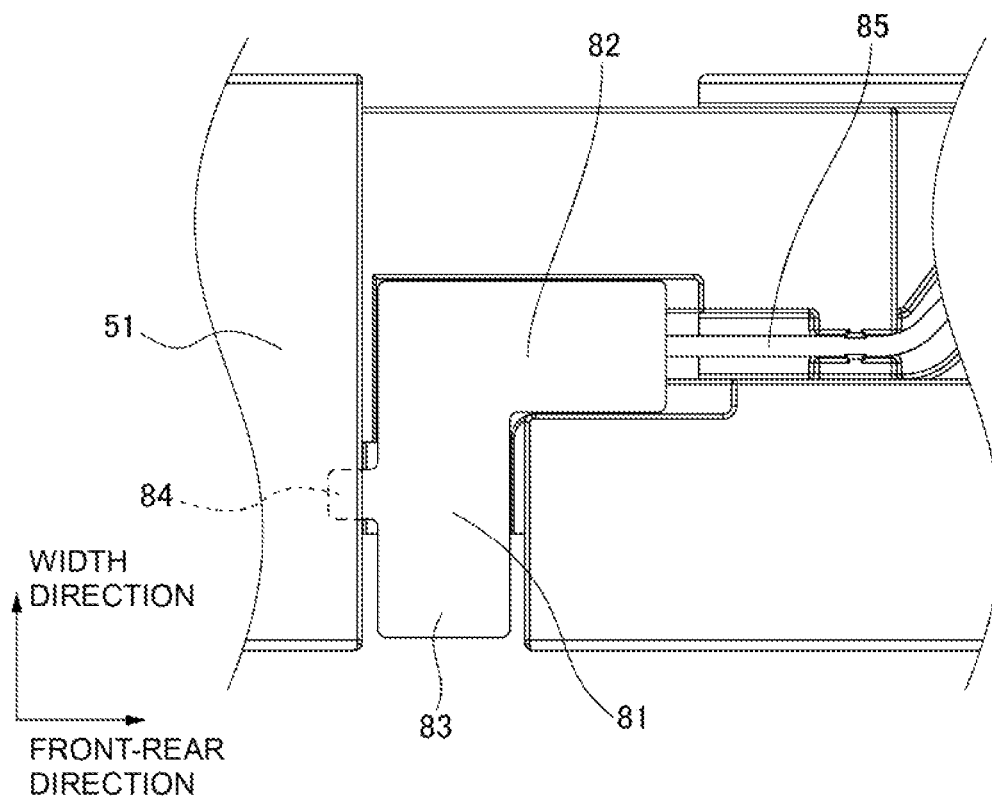
FIG. 6 is a view of the state shown in FIG. 5 as viewed from above.

FIGS. 4A and 4B are views for explaining a step of inserting the retaining piece 84 of the connection terminal 80 into the retaining hole 54 of the housing 51. FIG. 4A is a view of FIG. 3 as viewed from a lateral side (a front side of the paper), and FIG. 4B is a view corresponding to FIG. 4A, showing an initial state of inserting the retaining piece 84 into the retaining hole 54. FIG. 5 is a view corresponding to FIGS. 4A and 4B, showing a state in which the retaining piece 84 is completely inserted into the retaining hole 54 and the connection terminal 80 is accommodated in the accommodating recess 53 of the housing 51. FIG. 6 is a view of the state shown in FIG. 5 as viewed from above.

As shown in FIGS. 3, 4A and 4B, when the connection terminal 80 is accommodated into the terminal accommodating recess 53a, the retaining piece 84 is inserted into the retaining hole 54 from the front side toward the rear side in the front-rear direction. As particularly shown in FIG. 4A, the retaining piece 84 is inserted into the retaining hole 54 in a state in which the connection terminal 80 is inclined such that the retaining piece 84 is located below the front end portion of the second portion 82 (see an arrow Y1).

When the retaining piece 84 is inserted to a predetermined position in the retaining hole 54, the connection terminal 80 is moved toward the terminal accommodating recess 53a (i.e., downward) (see an arrow Y2), as particularly shown in FIG. 4B. At this time, for example, the connection terminal 80 may be moved toward the terminal accommodating recess 53a with a front end edge of the inclined surface 55 (an end edge located at the uppermost position in the inclined surface 55) as a fulcrum.

When the retaining piece 84 is completely inserted into the retaining hole 54 and the connection terminal 80 is accommodated in the terminal accommodating recess 53a, the retaining piece 84 and the retaining hole 54 are locked to each other as shown in FIGS. 5 and 6. Specifically, as particularly shown in FIG. 5, an upper plate surface 84a of the connection terminal 80 and a hole inner surface 54a of an upper wall portion of the retaining hole 54 are adjacent to each other in the upper-lower direction. Accordingly, upward displacement of the connection terminal 80 is restricted. That is, the connection terminal 80 is prevented from falling off from the housing 51.

Figure 7:
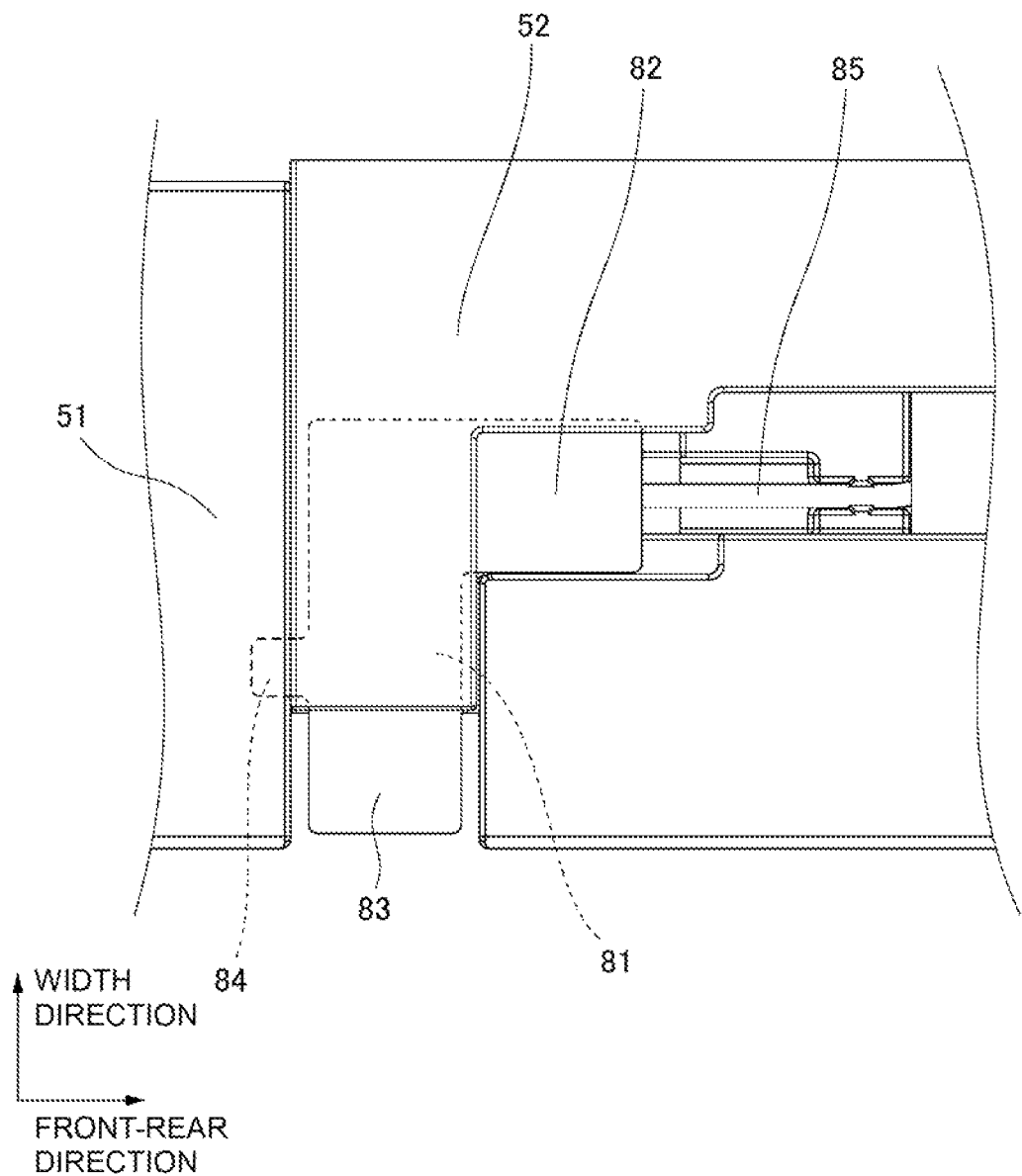
FIG. 7 is a view of the state shown in FIG. 2 as viewed from above.

FIG. 7 is a view of the plate 50 for the battery stack, in a state in which the insulating cover 52 is temporarily locked, as viewed from above.

When the connection terminal 80 and the electric wire 85 are accommodated in the accommodating recess 53, the insulating cover 52 is attached to the housing 51. The insulating cover 52 is configured to be movable between a temporarily locked state (see FIGS. 2 and 7) in which the insulating cover 52 covers the accommodating recess 53 so as to expose the connection portion 83 and a fully locked state in which the insulating cover 52 covers the entire accommodating recess 53.

As shown in FIGS. 2 and 7, when the connection terminal 80 and the electric wire 85 are accommodated in the accommodating recess 53, the insulating cover 52 is attached to the housing 51 in the temporarily locked state. In the temporarily locked state of the insulating cover 52, at least a part of the first portion 81 and the second portion 82 other than the connection portion 83 is covered. That is, the insulating cover 52 presses the connection terminal 80 at the above-described portion in the temporarily locked state. Accordingly, the upward displacement of the connection terminal 80 is further restricted. That is, the connection terminal 80 is more appropriately prevented from falling off from the housing 51.

<Functions and Effects>

According to the plate 50 for the battery stack according to the present embodiment, the retaining piece 84 of the connection terminal 80 is inserted into the retaining hole 54 provided in the terminal accommodating recess 53a of the housing 51, whereby the retaining piece 84 and the retaining hole 54 are locked to each other. As a result, the connection terminal 80 accommodated in the terminal accommodating recess 53a is prevented from falling off from the housing 51.

Further, according to the plate 50 for the battery stack according to the present embodiment, since the terminal accommodating recess 53a has the inclined surface 55 in the vicinity of the opening of the retaining hole 54 (in this example, inside the retaining hole 54 and on the front side in the front-rear direction), the retaining piece 84 can be easily inserted into the retaining hole 54 by inserting the retaining piece 84 into the retaining hole 54 aiming at the inclined surface 55 when the connection terminal 80 is accommodated into the terminal accommodating recess 53a. For example, when an angle of inserting the retaining piece 84 into the retaining hole 54 is equal to or larger than an inclination angle of the inclined surface 55 (and equal to or smaller than 90 degrees), the retaining piece 84 is guided by the inclined surface 55 to be inserted into the retaining hole 54.

If the terminal accommodating recess 53a does not have the inclined surface 55 in the vicinity of the opening of the retaining hole 54, a plate surface of the terminal accommodating recess 53a and the retaining piece 84 may interfere with each other when the retaining piece 84 is inserted into the retaining hole 54, and the retaining piece 84 is not easily inserted into the retaining hole 54. However, in a configuration of the present embodiment, since the terminal accommodating recess 53a is provided with the inclined surface, the retaining piece 84 is easily inserted into the retaining hole 54 as described above.

Further, according to the plate 50 for the battery stack according to the present embodiment, since the connection terminal 80 has the L shape as a result of the first portion 81 and the second portion 82 intersecting each other, the electric wires 85 can be drawn out in a direction different from a direction in which the conductive plate 40 is located.

Further, according to the plate 50 for the battery stack according to the present embodiment, since the retaining piece 84 of the connection terminal 80 is provided at the first portion in the same manner as the connection portion 83, the connection portion 83 is prevented from being lifted from the terminal accommodating recess 53a. Accordingly, reliability of electrical connection between the connection portion 83 and the conductive plate 40 is improved as compared with a case where the retaining piece 84 is not provided at the first portion 81.

In addition, since a direction in which the retaining piece 84 protrudes is parallel to the pull-out direction of the electric wire 85, the retaining piece 84 can be easily inserted into the retaining hole 54 without interference of the electric wire 85 when the retaining piece 84 is inserted into the retaining hole 54.

Further, according to the plate 50 for the battery stack according to the present embodiment, since the plate 50 for the battery stack includes the insulating cover 52 that is movable between the temporarily locked state and the fully locked state and covers at least a part of the connection terminal 80 in the temporarily locked state, the insulating cover 52 presses the connection terminal 80 in the temporarily locked state. Accordingly, the connection terminal 80 is prevented from falling off the housing 51 by the retaining piece 84 and the retaining hole 54 until the insulating cover 52 is attached to the housing 51, and when the insulating cover 52 is attached to the housing 51, the connection terminal 80 is more appropriately prevented from falling off the housing 51 by the retaining piece 84, the retaining hole 54, and the insulating cover 52.

Further, according to the plate 50 for the battery stack according to the present embodiment, the housing 51 is provided with the retaining hole 54 and the connection terminal 80 is provided with the retaining piece 84, it is not necessary to provide the housing 51 with a lock structure or the like for preventing the connection terminal 80 from falling off. Therefore, a height of the plate 50 for the battery stack can be reduced, and thus a size of the battery stack t can be reduced.

Other Embodiments

The present disclosure is not limited to the embodiment described above, and modifications, improvements, and the like can be made as appropriate. In addition, materials, shapes, dimensions, numbers, arrangement positions, and the like of components in the embodiment described above are optional and are not limited as long as the invention can be achieved.

According to a first illustrative aspect of the present disclosure, a plate (50) for a battery stack includes: a plate-shaped terminal (80) to which an electric wire (85) is connected; and a plate-shaped housing (51) having an accommodating recess (53) where the terminal is accommodated. The accommodating recess (53) includes a retaining hole (54). The terminal (80) includes a connection portion (83) that is electrically connected to a counterpart member (40), and a retaining piece (84) that is inserted into the retaining hole (54) and locked to the retaining hole (54).

The plate for the battery stack of the first aspect will be described below. The terminal is connected to the electric wire and is connected to a counterpart member at the connection portion. The terminal is accommodated in the accommodating recess such that the retaining piece provided in the terminal is inserted into the retaining hole provided in the accommodating recess of the housing and locked to the retaining hole. As a result, in the plate for the battery stack according to the present configuration, it is possible to prevent the terminal from falling off without providing a member that prevents the terminal from falling off from the accommodating recess.

According to a second illustrative aspect of the present disclosure, the accommodating recess (53) may have an inclined surface (55) that is inclined such that a plate thickness of the housing (51) decreases from a proximal end side in an insertion direction in which the retaining piece (84) is inserted into the retaining hole (54) toward a distal end side in the insertion direction. The inclined surface (55) may be provided in a vicinity of an opening of the retaining hole (54).

The plate for the battery stack of the second aspect will be described below. In the accommodating recess, the inclined surface that is inclined such that the plate thickness of the housing decreases from the proximal end side toward the distal end side in the insertion direction is provided in the vicinity of the opening of the retaining hole. Accordingly, in the plate for the battery stack according to the present configuration, the retaining piece of the terminal can be easily inserted into the retaining hole by inserting the retaining piece into the retaining hole aiming at the inclined surface of the accommodating recess.

According to a third illustrative aspect of the present disclosure, the terminal (80) may include a first portion (81) having the connection portion (83) at an end portion of the first portion (81), and a second portion (82) that is continuous with the first portion (81) on a side opposite to the end portion and to which the electric wire (85) is connected. The terminal (80) may have an L shape in which the first portion (81) and the second portion (82) intersect with each other.

The plate for the battery stack of the third aspect will be described below. The terminal includes the first portion whose end portion is provided with the connection portion, and the second portion that is continuous with the first portion on the side opposite to the end portion provided with the connection portion and to which the electric wire is connected. The terminal has the L shape as a result of the first portion and the second portion intersecting each other. Accordingly, in the plate for the battery stack according to the present configuration, the electric wire can be drawn out in a direction different from a direction in which the counterpart member is located.

According to a fourth illustrative aspect of the present disclosure, the retaining piece (84) may be provided at the first portion (81).

The plate for the battery stack of the fourth aspect will be described below. The retaining piece of the terminal is provided at the first portion where the connection portion is provided. Accordingly, in the plate for the battery stack according to the present configuration, the connection portion is prevented from being lifted from the accommodating recess, and thus reliability of electrical connection between the connection portion and the counterpart member is improved as compared with a case where the retaining piece is not provided at the first portion.

According to a fifth illustrative aspect of the present disclosure, the plate (50) for the battery stack may further include an insulating cover (52) that is attached to the housing (51) to cover the accommodating recess (53). The insulating cover (52) may be configured to: move between a temporarily locked state in which the insulating cover (52) covers the accommodating recess (53) to expose the connection portion (83) and a fully locked state in which the insulating cover (52) covers the entire accommodating recess (53); and cover at least a part of the terminal (80) in the temporarily locked state.

The plate for the battery stack of the fifth aspect will be described below. The plate for the battery stack according to the present configuration further includes an insulating cover configured to be movable between the temporarily locked state in which the insulating cover covers the accommodating recess so as to expose the connection portion and the fully locked state in which the insulating cover covers the entire accommodating recess. The insulating cover is configured to cover at least a part of the terminal in the temporarily locked state. Accordingly, in plate for the battery stack according to the present configuration, the insulating cover presses the terminal in the temporarily locked state, and thus the terminal is prevented from falling off. That is, the terminal is prevented from falling off from the housing by the retaining piece and the retaining hole until the insulating cover is attached to the housing, and when the insulating cover is attached to the housing, the terminal is more appropriately prevented from falling off from the housing by the retaining piece, the retaining hole, and the insulating cover.

According to the present disclosure, it is possible to provide the plate for the battery stack that prevents a terminal from falling off.

What is claimed is:

1. A plate for a battery stack, comprising:
   a flat-shaped terminal to which an electric wire is connected;
   a plate-shaped housing including a flat upper plate surface and a flat lower plate surface, the plate shaped housing having an accommodating recess where the terminal is accommodated; and
   an insulating cover that is attached to the housing and covering the accommodating recess, wherein
   the accommodating recess includes a retaining hole,
   the terminal includes a connection portion that is electrically connected to a counterpart member, and a retaining piece that is inserted into the retaining hole and locked to the retaining hole,
   the retaining piece is a flat-shaped protruding piece that protrudes from one part of an outer peripheral edge of the flat-shaped terminal along a planar direction of the terminal,
   the accommodating recess is a recessed portion that is recessed downward from the flat upper surface of the plate-shaped housing,
   the retaining hole is a hole that is recessed from a side wall of the accommodating recess along a planar bottom surface of the accommodating recess, and
   a lower surface of the insulating cover is directly contacting an upper surface of the terminal and an upper surface of the insulating cover is aligned with the flat upper plate surface of the housing.

2. The plate for the battery stack according to claim 1, wherein
   the accommodating recess has an inclined surface that is inclined such that a plate thickness of the housing decreases from a proximal end side in an insertion direction in which the retaining piece is inserted into the retaining hole toward a distal end side in the insertion direction, and
   the inclined surface is provided in a vicinity of an opening of the retaining hole.

3. The plate for the battery stack according to claim 1, wherein
   the terminal includes a first portion having the connection portion at an end portion of the first portion, and a second portion that is continuous with the first portion on a side opposite to the end portion and to which the electric wire is connected, and
   the terminal has an L shape in which the first portion and the second portion intersect with each other.

4. The plate for the battery stack according to claim 3, wherein
   the retaining piece is provided at the first portion.

5. The plate for the battery stack according to claim 1, wherein
   the insulating cover is configured to:
   move between a temporarily locked state in which the insulating cover covers the accommodating recess to expose the connection portion and a fully locked state in which the insulating cover covers the entire accommodating recess; and
   cover at least a part of the terminal in the temporarily locked state.

* * * * *